United States Patent
Yoon et al.

(10) Patent No.: US 10,909,649 B2
(45) Date of Patent: Feb. 2, 2021

(54) METHOD AND APPARATUS FOR REMOVING HIDDEN DATA BASED ON AUTOREGRESSIVE GENERATIVE MODEL

(71) Applicant: Seoul National University R&DB Foundation, Seoul (KR)

(72) Inventors: Sungroh Yoon, Seoul (KR); Ho Bae, Siheung-si (KR); Dahuin Jung, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 65 days.

(21) Appl. No.: 16/244,404

(22) Filed: Jan. 10, 2019

(65) Prior Publication Data

US 2020/0134774 A1    Apr. 30, 2020

(30) Foreign Application Priority Data

Oct. 24, 2018 (KR) .................... 10-2018-0127108

(51) Int. Cl.
| | |
|---|---|
| *G06T 1/00* | (2006.01) |
| *G06N 7/00* | (2006.01) |
| *G06T 7/13* | (2017.01) |
| *G06T 5/00* | (2006.01) |
| *G06N 3/08* | (2006.01) |

(52) U.S. Cl.
CPC ............. *G06T 1/0021* (2013.01); *G06N 3/08* (2013.01); *G06N 7/005* (2013.01); *G06T 5/001* (2013.01); *G06T 7/13* (2017.01); *G06T 2201/0065* (2013.01); *G06T 2207/20084* (2013.01)

(58) Field of Classification Search
CPC ......... G06T 1/0021; G06T 7/13; G06T 5/001; G06T 2207/20084; G06T 2201/0065; G06N 7/005; G06N 3/08
See application file for complete search history.

(56) References Cited

U.S. PATENT DOCUMENTS

| | | | |
|---|---|---|---|
| 6,201,879 B1 * | 3/2001 | Bender | G06T 1/0028 |
| | | | 382/100 |
| 2009/0003646 A1 * | 1/2009 | Au | H04N 1/32208 |
| | | | 382/100 |

FOREIGN PATENT DOCUMENTS

CN        106934780    *  3/2017

OTHER PUBLICATIONS

Machine translation for CN 106934780 (Year: 2017).*
Korean Office Action for related KR Application No. 10-2018-0127108 dated Dec. 11, 2019 from Korean Intellectual Property Office.

(Continued)

*Primary Examiner* — Qian Yang
(74) *Attorney, Agent, or Firm* — Paratus Law Group, PLLC (57) ABSTRACT

Disclosed is a hidden data removal method based on an autoregressive generative model which is performed by a computer device. The hidden data removal method includes receiving a source image, randomly selecting a target pixel from the source image, and inputting the source image and an identifier of the target pixel to an autoregressive generative model and restoring the target pixel from the source image. The source image is an image in which steganography-based data is hidden, and the autoregressive generative model restores the target pixel on the basis of a pixel value distribution for pixels adjacent to the target pixel in the source image.

15 Claims, 11 Drawing Sheets

(56) References Cited

OTHER PUBLICATIONS

M. Jiang et al., "Steganalysis of Boundary-based Steganography using Autoregressive Model of Digital Boundaries", IEEE International Conference on Multimedia and Expo (ICME), Jul. 31, 2004, pp. 1-5.

Aäron Van Den Oord et al., "Conditional Image Generation with PixelCNN Decoders", Computer Vision and Pattern Recognition, Jun. 18, 2016, pp. 1-13.

* cited by examiner

METHOD AND APPARATUS FOR REMOVING HIDDEN DATA BASED ON AUTOREGRESSIVE GENERATIVE MODEL

CROSS-REFERENCE TO RELATED APPLICATION

This application claims the benefit under 35 U.S.C. § 119(a) of Korean Patent Application No. 10-2018-0127108, filed on Oct. 24, 2018, in the Korean Intellectual Property Office, the entire disclosure of which is incorporated herein by reference for all purposes.

BACKGROUND

The following description relates to a technique for removing hidden data using steganography.

Steganography is a technique for concealing certain information within digital content. Recently, there has also been a leak of industrial secrets using steganography. Steganalysis is a technique of detecting hidden data using steganography. Steganalysis techniques using machine learning have been studied.

SUMMARY

In one general aspect, there is provided a method of removing hidden data based on an autoregressive generative model which is performed by a computer device, the method including receiving a source image, randomly selecting a target pixel from the source image, and inputting the source image and an identifier of the target pixel to an autoregressive generative model and restoring the target pixel from the source image. The source image is an image in which steganography-based data is hidden, and the autoregressive generative model restores the target pixel on the basis of a pixel value distribution for pixels adjacent to the target pixel in the source image.

In another general aspect, there is provided an apparatus for removing hidden data based on an autoregressive generative model, the apparatus including an input device configured to receive a source image in which steganography-based data is hidden, a storage device configured to store an autoregressive generative model for restoring a specific pixel on the basis of a pixel value distribution for pixels adjacent to the specific pixel in the image; and a computation device configured to select a plurality of target pixels from the source image, input the source image and an identifier of the target pixel to the autoregressive generative model, and restore the target pixel.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Steganography is a technique for concealing certain information within information constituting digital content. For example, steganography may hide certain information using some bits of a pixel value of an image.

The following description is a technique of removing hidden data on the basis of steganography. Digital content may be defined as values with a certain distribution. For example, an image is composed of pixels, and a series of pixel values have a certain distribution. In the following description, hidden data is removed based on a certain distribution value. A detailed description thereof will be described below. Digital content (sound or the like) except for an image may also be configured with a specific information distribution. Accordingly, the following description may be applied universally regardless of the type of digital content. For convenience of description, however, the following description focuses on an image.

Some terms used herein will be defined.

An invader is an entity that intends to leak certain information using steganography on digital content. A user is an entity that uses digital content, an entity that receives digital content, or an entity that is allowed to access digital content.

Data that an invader wants to transmit using steganography is called hidden data. Generally, a source image refers to an original image, which has never been modified, but the source image includes an image including hidden data in the following description. Strictly speaking, a source image refers to an image that may include hidden data. Accordingly, the source image corresponds to any one of an image that includes hidden data and an original image that does not include hidden data.

Figure 1:
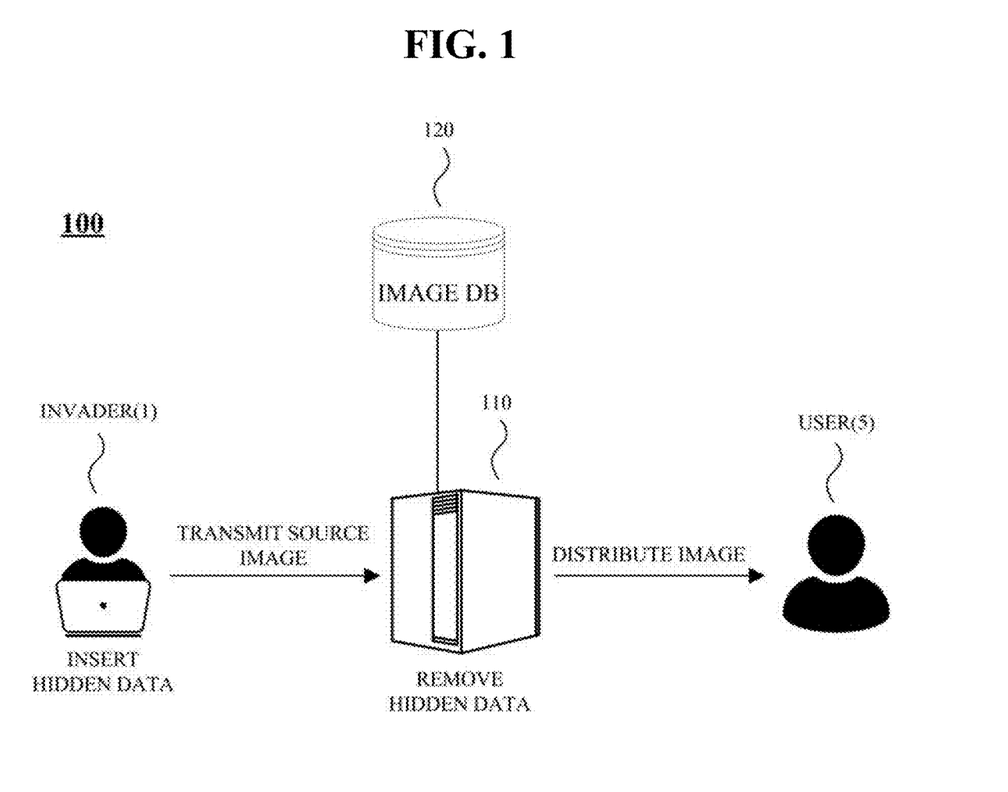
FIG. 1 illustrates an example system for processing hidden data.

FIG. 1 illustrates an example hidden data processing system 100. In the hidden data processing system 100, an apparatus for removing hidden data is an image processing server 110.

An invader 1 inserts hidden data into a source image using steganography. The invader 1 may transmit the source image to the outside over a network. The image processing server 110 is located in a path through which source images are delivered (distributed) so that the image processing server 110 processes the source image delivered by the invader 1 in a certain fashion. The image processing server 110 may store the processed source image in an image database (DB) 120. The image processing server 110 may be a service server that provides digital content. The image processing server 110 may process digital content and deliver the processed digital content to the service server. A user 5 may access a source image processed by the image processing server 110 or a source image stored in the image DB 120. The hidden data processing system 100 is a system configured to process an image input to the image processing server 110 in a certain fashion and distribute the processed image to a user.

The image processing server 110 resets (regenerates) a pixel value of the source image. The image processing server 110 may regenerate some specific pixels among pixels of the source image. The hidden data may be included in all the pixels of the image or in pixels in a specific region of the image. The image processing server 110 removes hidden data by correcting data regarding at least some pixels among pixels constituting the hidden data. A process of removing the hidden data will be described below.

Figure 2:
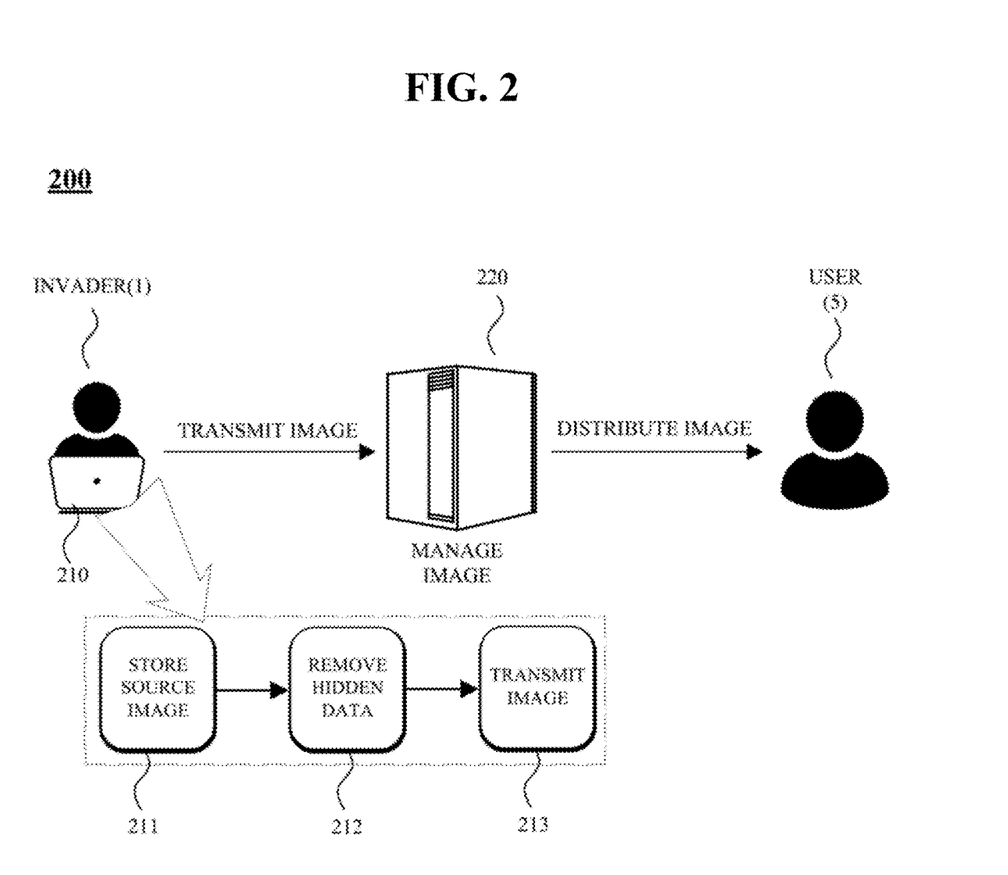
FIG. 2 illustrates an example system for processing hidden data.

FIG. 2 illustrates another example hidden data processing system 200. In the hidden data processing system 200, an apparatus of removing hidden data is an image processing terminal 210. The image processing terminal 210 may be a client device.

The invader 1 may use his/her terminal 210 to insert hidden data into a source image. Alternatively, the invader 1 may use the image processing terminal 210 to insert hidden data into a source image.

A program or application distributed by a content provider may be installed in the image processing terminal 210. The program or application may be used by a content provider to deliver a source image. The image processing terminal 210 may be a terminal that is internally used to deliver an image by a company that creates or manages certain digital content. The image processing terminal 210 may be a personal terminal but may be a terminal in which the aforementioned program or application is installed. The image processing terminal 210 is located in a path through which certain source images are delivered (distributed) to the outside irrespective of the type and is configured to process a source image. The image processing terminal 210 may deliver the processed source image to a management server 220. A user 5 may receive the source image from the management server 220. Although not shown in FIG. 2, the user 5 may receive a source image from the image processing terminal 210 directly in a peer-to-peer (P2P) fashion.

The image processing terminal 210 stores a source image received from the invader 211. The image processing terminal 210 resets (regenerates) a pixel value of the source image. The image processing terminal 210 may regenerate some specific pixels among pixels of the source image. The hidden data may be included in all the pixels of the image or in pixels in a specific region of the image. The image processing terminal 210 removes hidden data by correcting data regarding at least some pixels among pixels constituting the hidden data 212. The image processing terminal 210 may deliver the source image from which the hidden data has been removed to the management server 220 or another object 213.

Figure 3:
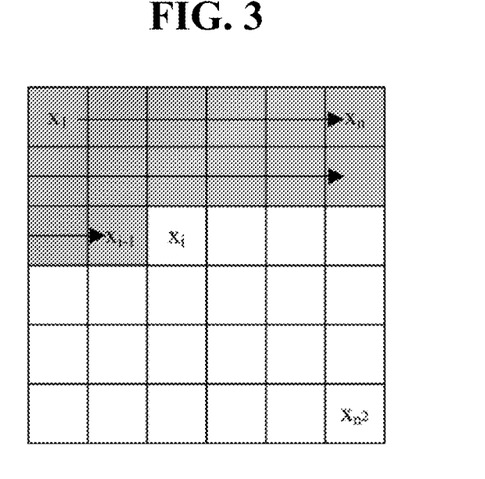
FIG. 3 illustrates an example of generating an image in units of pixels.

FIG. 3 illustrates an example of generating an image in units of pixels. FIG. 3 illustrates an image x having n×n pixels. The image x corresponds to a set of pixels with a certain pixel value distribution. The image x is composed a series of pixels $\chi_1, \ldots, \chi_{n^2}$ in one dimension. The order in which pixels are read may be from top to bottom, as shown in FIG. 3. In the same row, the order may be from left to right. The distribution of the image x may be expressed using Equation 1 below:

$$p(x) = \prod_{i=1}^{n^2} p(x_i \mid x_1, \ldots, x_{i-1})$$ [Equation 1]

where $p(\chi_i \mid \chi_1, \ldots, \chi_{i-1})$ indicates the probability p of $\chi_i$ when previous pixels $\chi_1, \ldots, \chi_{i-1}$ are given. That is, when there is information regarding the previous pixels, the probability of the current $i^{th}$ pixel may be estimated, and an image may be generated in units of pixels.

A color image is composed of individual color channels such as RGB. Accordingly, one pixel $\chi_i$ is represented as a combination of the color channels. In this case, the probability value of $\chi_i$ may be expressed using Equation 2 below:

$$p(\chi_{i,R} \mid X_{<i}) p(\chi_{i,G} \mid X_{<i}, \chi_{i,R}) p\chi_{i,B} \mid X_{<i}, \chi_{i,R}, \chi_{i,G}).$$ [Equation 2]

That is, the color channels may be determined according to previously generated (or given) pixels as well as other color channels.

For convenience of description, an entity that removes hidden data is called a computer device. Accordingly, the aforementioned image processing server 110 or image processing terminal 210 corresponds to a computer device. The computer device refers to a device that performs certain computation according to a certain program or source code. The computer device includes a server, a personal computer (PC), a smart device, or an image processing-dedicated chipset, and the like.

The computer device removes hidden data using a certain machine learning model. The computer device may remove hidden data using a learning module such as a neural network. The computer device may generate an image in units of pixels on the basis of previous data. Accordingly, the computer device may use a certain generative model to remove hidden data.

The generative model may include a generative adversarial network (GAN), a variational autoencoder (VAE), an autoregressive generative model, and the like. Since the computer device generates (or reconfigures) a source image in units of pixels, the computer device may prefer the autoregressive generative model. Hereinafter, a pixel to be generated by the computer device is called a target pixel.

The autoregressive generative model may include PixelRNN, PixelCNN, Gated PixelCNN, and the like. The computer device may use any one of the PixelRNN, PixelCNN, and Gated PixelCNN to remove hidden data. As a result, the autoregressive generative model generates a target pixel on the basis of a likelihood of the pixel value distribution.

The computer device may determine a probability value (pixel value) of the target pixel to maintain a peak signal-to-noise ratio (PSNR) and a structure similarity index (SSIM) at a certain level or higher on the basis of the entire source image or the peripheral region of the target pixel in the source image. The computer device may measure the likelihood in a logarithmic scale and may estimate the probability value of the target pixel on the basis of the measured likelihood. The computer device may determine the probability value of the target pixel such that the target pixel, as well as other pixels which are to be compared, maintains at least one of the PSNR and SSIM at a reference value or greater. Accordingly, in fact, the computer device may use various models capable of inferring the probability value of the target pixel on the basis of a pixel value distribution in the image.

It is assumed that the computer device generates a target pixel using the autoregressive generative model and removes the hidden data using the target pixel. The following is based on the PixelCNN, which is capable of providing fast processing. However, the computer device does not necessarily have to use the PixelCNN. Furthermore, the computer device may use various modified models obtained by improving the PixelCNN. For example, according to the basic PixelCNN, pixels are configured by scanning the pixels in a mask in a certain order. Therefore, a blind spot may occur in the pixel configuration, and the Gated PixelCNN is a model proposed in order to prevent the occurrence of the blind spot. The Gated PixelCNN uses a horizontal stack and a vertical stack instead of a general ReLU. For convenience of description, the following description is based on the basic PixelCNN.

The generative model used by the computer device to remove hidden data may estimate a certain pixel value on the basis of the currently input image. Furthermore, the generative model may be a model that is learned in advance in a certain fashion. For example, specific images (drawings, layouts, etc.) have uniformly standardized formats. In this case, the generative model may be prepared in advance using learning data. In this case, when an input image is given, the generative model may determine the probability value or pixel value of the target pixel by performing only certain interference.

Figure 4:
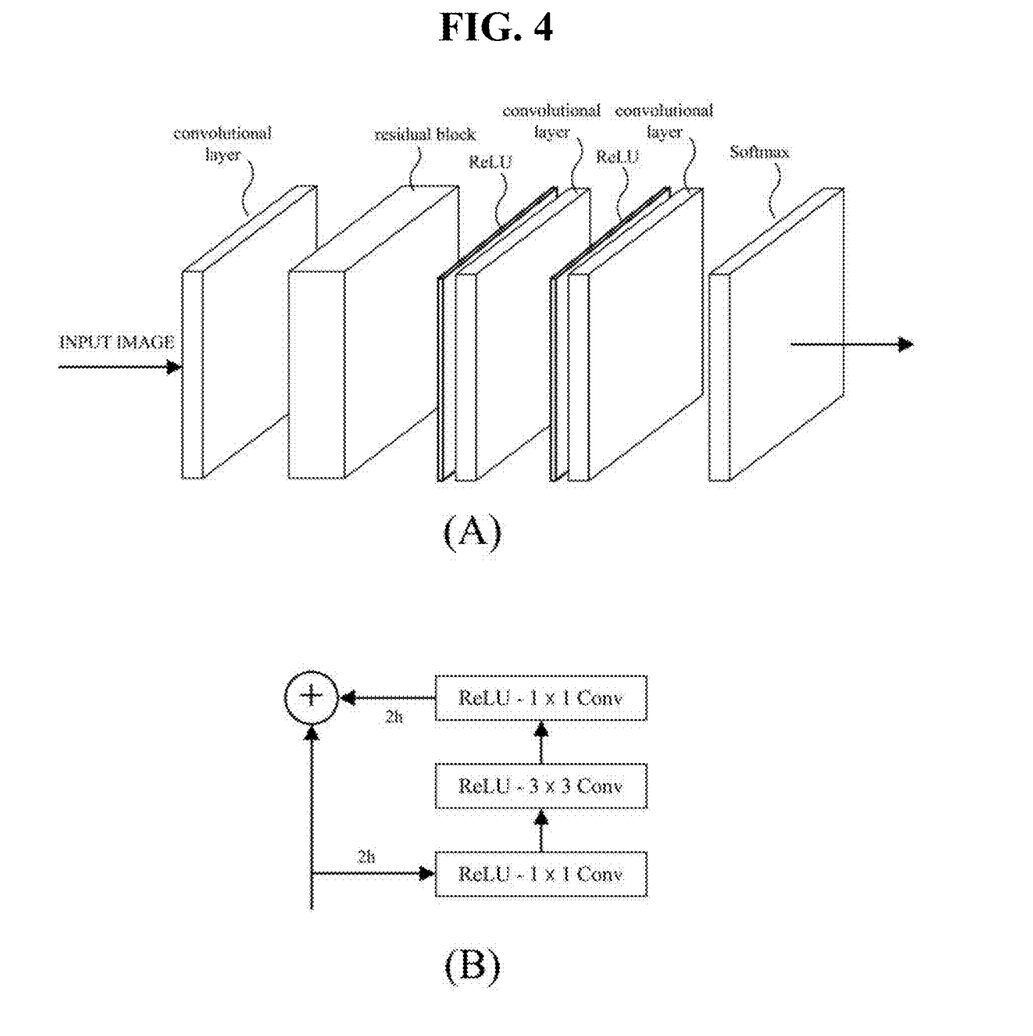
FIG. 4 illustrates an example of PixelCNN.

FIG. 4 illustrates an example of the PixelCNN. FIG. 4A shows a schematic configuration of the PixelCNN. The PixelCNN may be composed of a convolutional layer, a residual block, two ReLUs, a convolutional layer set, and a softmax model. Each of the ReLUs corresponds to an activation layer that reduces the amount of computation. As the activation layer, sigmoid, tanh, maxout, and the like as well as the ReLU may be used. FIG. 4 shows an example of the PixelCNN that may be used by the computer device. The computer device may use a more improved PixelCNN or a model suitable for generating a specific target pixel. The PixelCNN has no pooling layer. The PixelCNN sequentially generates or restores pixels but computes feature values of all the pixels at once. Accordingly, the PixelCNN is faster than the PixelRNN. FIG. 4B is an example configuration of a residual block. In FIG. 4B, "Conv" indicates a convolutional layer, and "h" indicates a feature value.

Figure 5:
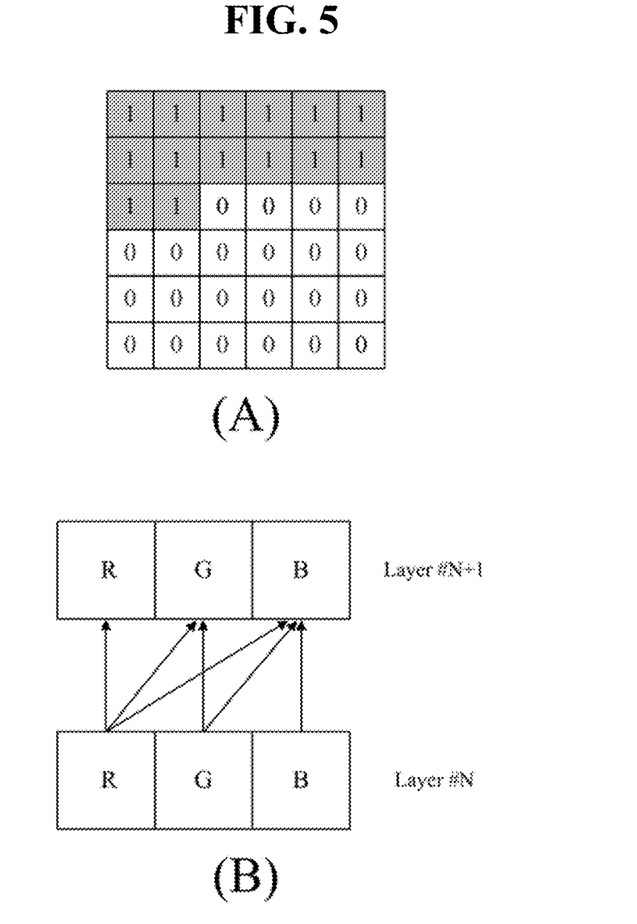
FIG. 5 illustrates an example mask.

The PixelCNN does not derive feature values of the entire image (all the pixels), but estimates a probability value of a pixel xi on the basis of $x_1$ to $x_{i-1}$. Accordingly, the feature value is estimated using a certain mask. FIG. 5 illustrates an example mask. FIG. 5A illustrates an example convolutional filter. The center of the filter corresponds to the target pixel. The filter assigns a weight of 1 to only a pixel prior to the target pixel in the mask and uses the prior pixel. Accordingly, the PixelCNN performs convolution in consideration of only the pixel prior to the target pixel in the mask. Furthermore, the image has R, G, and B color channels. A general CNN applies the filter to an RGB image to generate a single characteristic map. The PixelCNN generates a characteristic map for each color channel. FIG. 5B illustrates an example of a mask for a color channel. An $N+1^{th}$ layer is generated in consideration of R, G, and B channels of an $N^{th}$ layer. Using the mask of FIG. 5B, the PixelCNN generates a R-channel characteristic map of the $N+1^{th}$ layer using the R channel of the $N^{th}$ layer, generates a G-channel characteristic map of the $N+1^{th}$ layer using the R and G channels of the $N^{th}$ layer, and generates a B-channel characteristic map of the $N+1^{th}$ layer using the R, G, and B channels of the $N^{th}$ layer.

Figure 6:
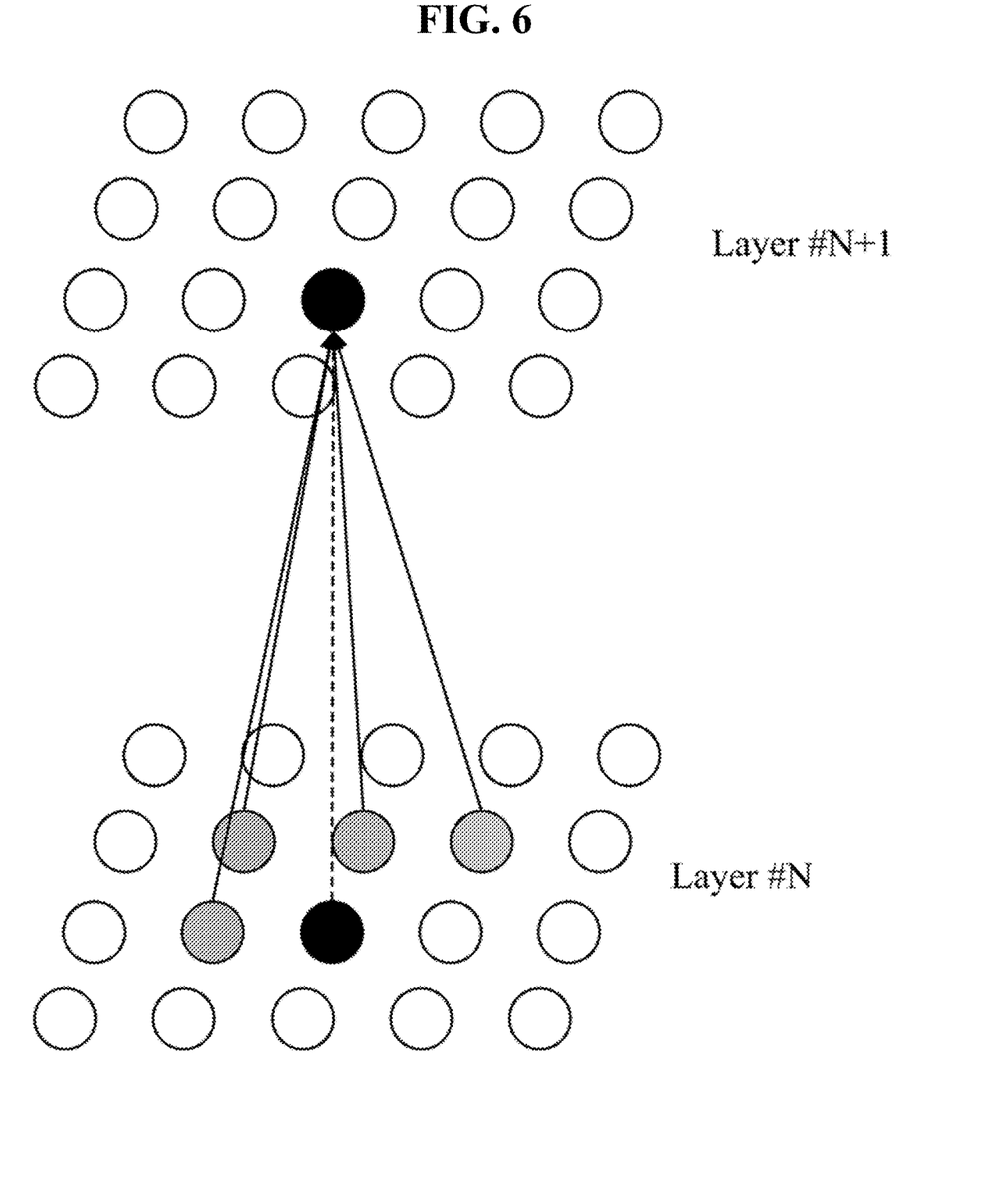
FIG. 6 illustrates an example input characteristic map and an example output characteristic map.

FIG. 6 illustrates an example input characteristic map and an example output characteristic map. The PixelCNN may configure an input characteristic map and an output characteristic map to have the same size. FIG. 6 is an example of a characteristic map that is generated when the mask shown in FIG. 5A is applied. In FIG. 6, a part indicated by black corresponds to a target pixel. A target pixel of the $N+1^{th}$ layer is generated by assigning a weight to only a pixel given prior to a target pixel of the $N^{th}$ layer in a mask region.

Figure 7:
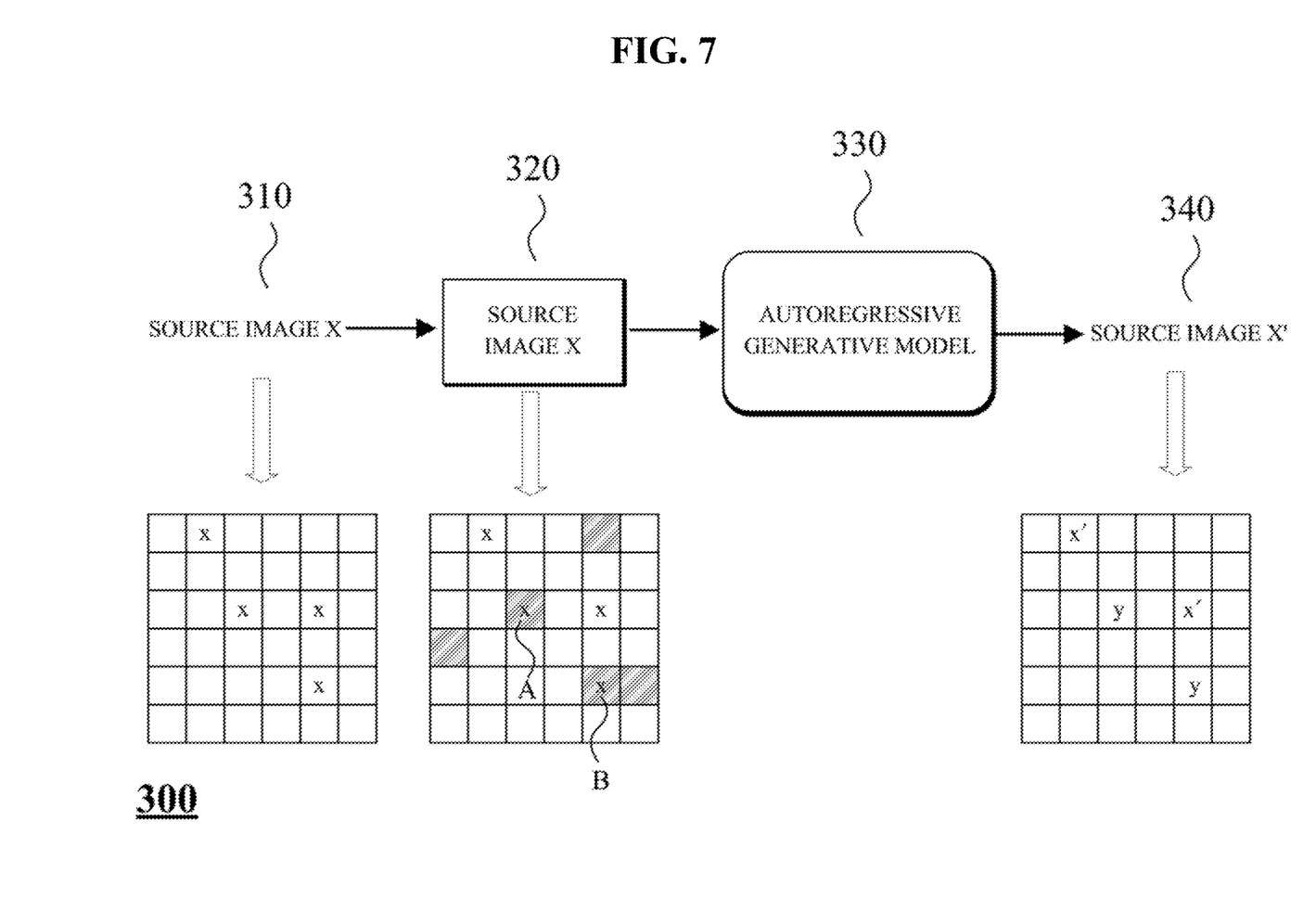
FIG. 7 illustrates an example process of removing hidden data.

FIG. 7 illustrates an example hidden data removal process 300. A computer device receives a source image X (310). The source image X includes hidden data. In FIG. 7, pixels constituting the hidden data are represented by x. The computer device selects a target pixel from the source image (320). The computer device may randomly select a plurality of target pixels from the source image. In order to remove the hidden data, the computer device may select a sufficient number of target pixels. Although not shown in FIG. 7, the computer device may change a pixel value of the selected target pixel to a specific value or a random value. In FIG. 7, the target pixel selected by the computer device is represented by a shaded or hatched region. Among the pixels constituting the hidden data, pixels A and B are selected as the target pixels.

The computer device inputs the source image to the aforementioned autoregressive generative model (330). In this case, the computer device may also deliver an identifier of the selected target pixel to the autoregressive generative model. The identifier of the target pixel indicates the location of the target pixel. The autoregressive generative model estimates a probability value of only the target pixel in the source image and determines a pixel value. The autoregressive generative model determines the probability value of the target pixel with reference to a pixel adjacent to the target pixel on the basis of a likelihood of the pixel value distribution. The autoregressive generative model may output a source image X' including a regenerated (restored) target pixel. In FIG. 7, target pixels restored by the autoregressive generative model are represented by y. As a result, the source image includes data from which information that an invader wants has been lost or data from which the hidden data has been removed.

In some cases, the autoregressive generative model may output a new pixel value of the target pixel. In this case, the computer device may change the pixel value of the target pixel in the source image.

Conventional steganographic algorithms (WOW, HUGO, S-UNIWARD, etc.) insert hidden data into a specific region of the source image. For example, many conventional techniques insert hidden data into a line (edge region) portion configured by an object existing in an image. This is to increase a degree of concealment by minimizing a change in the source image due to steganography. In consideration of such a case, the computer device may select a target pixel from or prior to a specific region.

Figure 8:
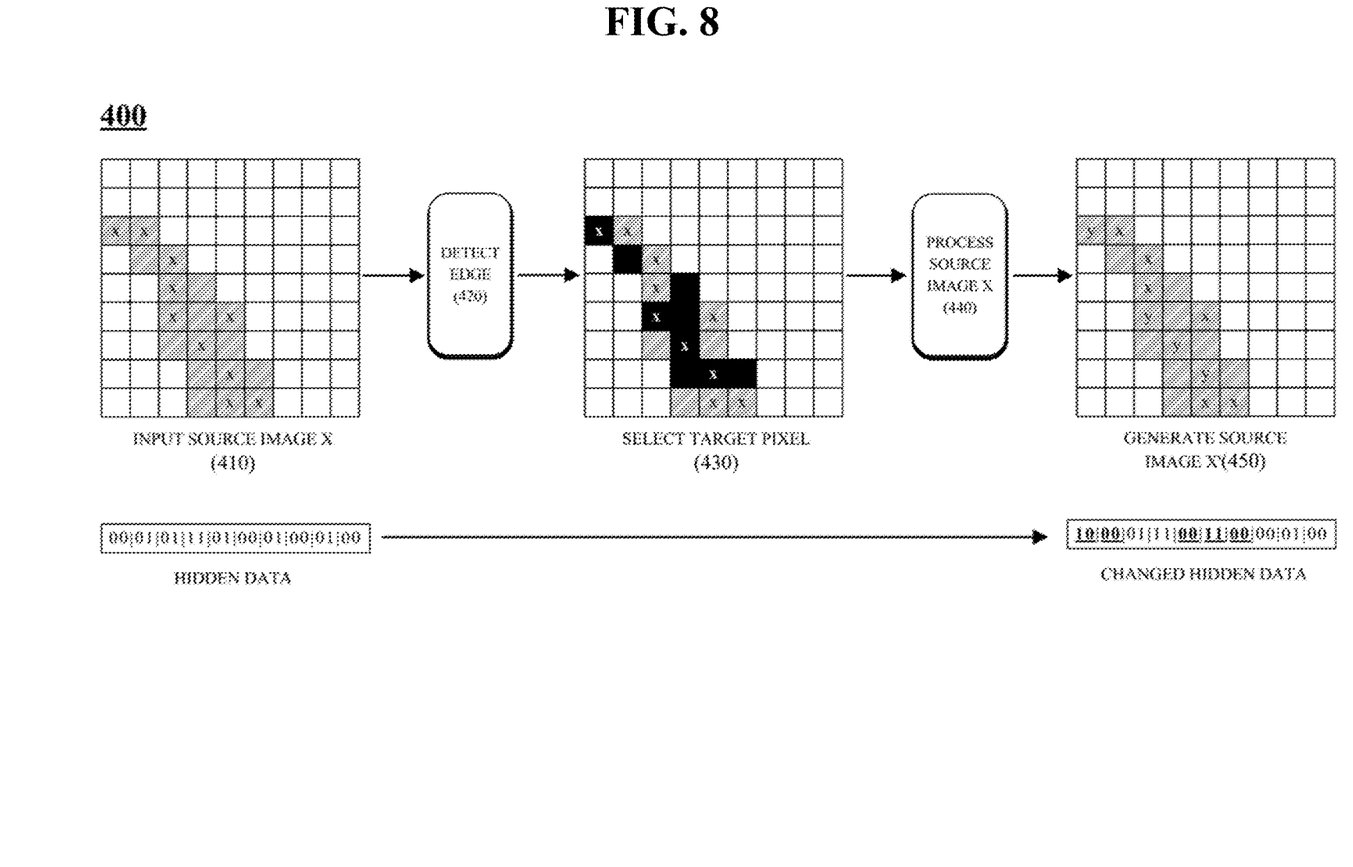
FIG. 8 illustrates another example process of removing hidden data.

FIG. 8 illustrates another example hidden data removal process 400. A computer device receives a source image X (410). The source image X includes hidden data. In FIG. 8, pixels constituting the hidden data are represented by x. In FIG. 8, a shaded (hatched) region indicates an edge region. Referring to FIG. 8, all the hidden data is placed in the edge region. That is, a source image in FIG. 8 includes data hidden by a steganographic algorithm such as WOW, HUGO, S-UNIWARD, and the like.

The computer device detects an edge region from the source image X (420). There are various algorithms for detecting an edge of an image. The computer device may use any one edge detection algorithm to detect the edge region from the source image X.

In an example (1), the computer device may detect the edge region by a first-order differential technique. The computer device may detect the magnitude of the edge for the corresponding point (pixel) through combination of a horizontal differential result and a vertical differential result. The computer device may detect a pixel having a specific value or greater as an edge region component in the edge detection process. The computer device may determine whether all pixels of the entire source image X correspond to the edge region and then may determine the edge region from the source image. Depending on the mask type, there are techniques such as Sobel, Prewit, and Robert. In an example (2), the computer device may detect the edge region by a second-order differential technique. Typically, there are techniques such as Laplacian, Laplacian of Gaussian (LoG), and Difference of Gaussian (DoG). In an example (3), the computer device may detect the edge region using the Canny edge detection technique.

The computer device may detect high-frequency regions from the image. The computer device may select a region having a frequency greater than or equal to a reference value and then select a target pixel. Accordingly, the computer device may determine the edge region as the region having the frequency greater than or equal to the certain reference value.

The computer device randomly selects a target pixel from the detected edge region (430). The computer device may randomly select a plurality of target pixels from the source image. In order to remove the hidden data, the computer device may select a sufficient number of target pixels. Although not shown in FIG. 8, the computer device may change a pixel value of the selected target pixel to a specific value or a random value. In FIG. 8, the target pixel selected by the computer device is represented by black. Referring to FIG. 8, four pixels are selected as the target pixels from among the pixels constituting the hidden data.

The computer device inputs the source image X to the aforementioned autoregressive generative model to process the image (440). In this case, the computer device may also deliver identifiers of the selected target pixels to the autoregressive generative model. The identifier of such a target pixel indicates the location of the target pixel. The autoregressive generative model estimates a probability value of only the target pixel in the source image and determines a pixel value. The autoregressive generative model determines the probability value of the target pixel with reference to a pixel adjacent to the target pixel on the basis of a likelihood of the pixel value distribution. The autoregressive generative model may output a source image X' including a regenerated (restored) target pixel (450). In FIG. 8, target pixels restored by the autoregressive generative model are represented by y.

At a lower portion of FIG. 8, hidden data included in the source image x is shown. Initial hidden data included in the source image X is displayed to the left. For convenience of description, it is assumed that each pixel constituting the hidden data includes two-bit information. The hidden data is composed of a certain bit string. FIG. 8 shows two separate bits indicated by each pixel. As described above, the computer device selects a plurality of target pixels from the edge region, and among the target pixels, four pixels constitute hidden data. The computer device regenerates a target pixel, and in the process, a pixel value of the target pixel is changed. At a lower right side of FIG. 8, the state of the hidden data changed along with the change of the pixel value of the target pixel is shown. The changed bits are underlined. The initial hidden data is changed to completely different data. As a result, the computer device generates a source image X', which is obtained by removing the hidden data from the source image X.

As described above, a target pixel is for changing a pixel value to control hidden data. The computer device computes a pixel value distribution for the source image X. The computer device may use the pixel value distribution to detect a certain edge region from the source image X. For example, the computer device may measure the intensity of the edge (i.e., a degree of change in pixel value) on the basis of a horizontal differential value and a vertical differential value for each pixel. There may be various equations or functions for measuring the intensity of an edge.

The computer device may select a target pixel from the entire source image. In this case, however, the computational complexity and the time complexity increase. Accordingly, the computer device may determine the edge region as a candidate region for selecting a target pixel. Actually, according to the steganography technique, it is possible to insert a larger amount of data into the edge region.

Furthermore, the computer device may select a target pixel from a smooth region instead of the edge region.

The computer device selects any target pixel from the source image and then changes a pixel value thereof. In this case, the computer device may make a difference in the degree of pixel value that is changed depending on the position of the target pixel. The difference between the current pixel value and the changed pixel value is called a variation. For example, the computer device may determine the variation on the basis of the pixel value of the target pixel in the edge region.

An example of adaptively determining the variation will be described. The variation unit $e_{norm}$ may be expressed using Equation 3 below:

$$e_{norm} = \left\lceil \frac{V[i,j,k]}{V_{max}} \times (\epsilon_{max} - \epsilon) \right\rceil + \epsilon \qquad \text{[Equation 3]}$$

where $V_{max}$ indicates a maximum pixel value in the edge region, V[i, j, k,] indicates the pixel value of the target pixel, i indicates a vertical position of the target pixel, j indicates a horizontal position of the target pixel, k indicates a color channel, $\epsilon$ indicates a minimum variation, $\epsilon_{max}$ indicates an allowed maximum variation, and $\epsilon$ and $\epsilon_{max}$ are predetermined values. In this case, $\epsilon_{max \leq 2} \cdot \epsilon$ may be satisfied.

When $e_{norm}$ is determined, the computer device may determine the value of the target pixel using $e_{norm}$. For example, the computer device may determine the range of the variation as shown in Equation 4 below. The range of the variation is $[r_{min}, r_{max}]$.

$r_{min} = \max(X[i,j,k] - e_{norm}, 0),$ $r_{max} = \min(X[i,j,k] + e_{norm}, 255)$ [Equation 4]

where X[i,j,k] may have various values. For example, X[i,j,k] may be a value of the target pixel or a value of a specific pixel associated with the target pixel. X[i, j, k] may be an average of the pixel value distribution for pixels neighboring to the target pixel.

It is preferable that the source image X' from which the hidden data has been removed does not differ greatly from the source image X. Accordingly, the computer device may determine a pixel value of the current target pixel in consideration of a neighboring target pixel having a pixel value changed in consideration of a pixel distribution in a region where the target pixel is located. Two target pixels are described as an example. The computer device changes a first target pixel to a certain value. The computer device may then determine a value within a certain range as a pixel value of a second target pixel, which is adjacent to the first target pixel, in consideration of a pixel value of the first target pixel.

Figure 9:
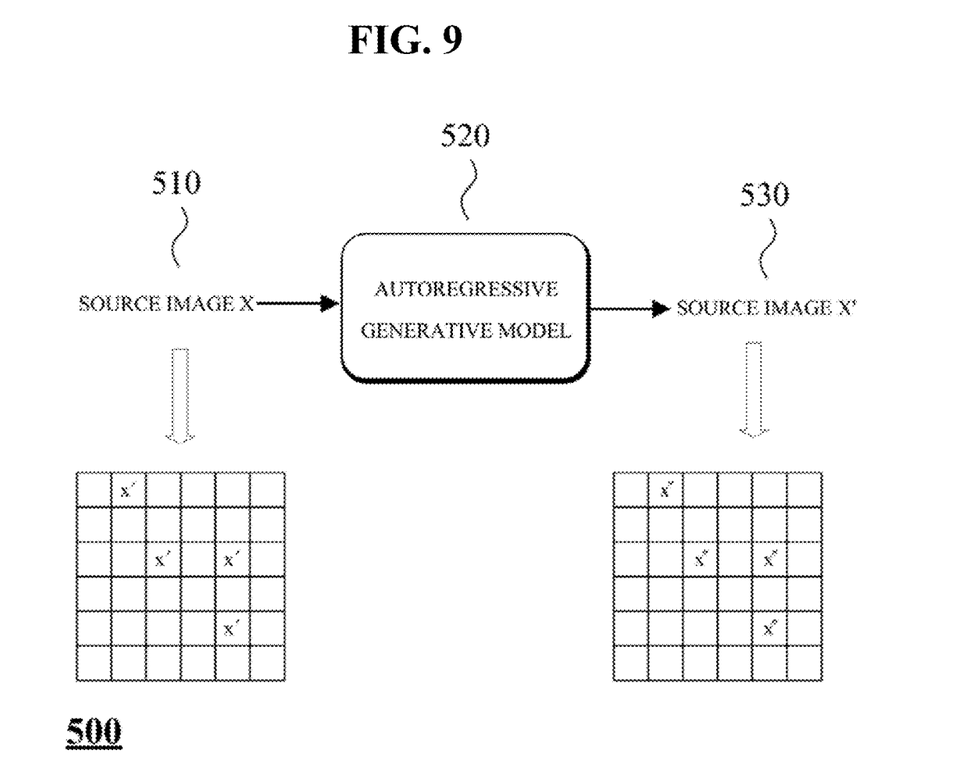
FIG. 9 illustrates still another example process of removing hidden data.

FIG. 9 illustrates still another example hidden data removal process 500. Unlike FIG. 7, in FIG. 9, the computer device selects no target pixel. As a result, FIG. 9 corresponds to an example in which the entire image is reconfigured according to a pixel order. A computer device receives a source image X (510). The source image X includes hidden data. In FIG. 9, pixels constituting the hidden data are represented by x'. The computer device inputs the source image to the aforementioned autoregressive generative model (520). The autoregressive generative model determines a probability value of a target pixel in a predetermined order with respect to all pixels of the source image. The autoregressive generative model determines the probability value of the target pixel with reference to a pixel adjacent to the target pixel on the basis of a likelihood of the pixel value distribution. The autoregressive generative model may output a source image X' including a regenerated (restored) target pixel (530). In FIG. 9, target pixels restored by the autoregressive generative model are represented by x". As a result, the source image includes data from which information that an invader wants has been lost or data from which the hidden data has been removed.

In some cases, the autoregressive generative model may output a new pixel value of the target pixel. In this case, the computer device may change the pixel value of the target pixel in the source image.

Figure 10:
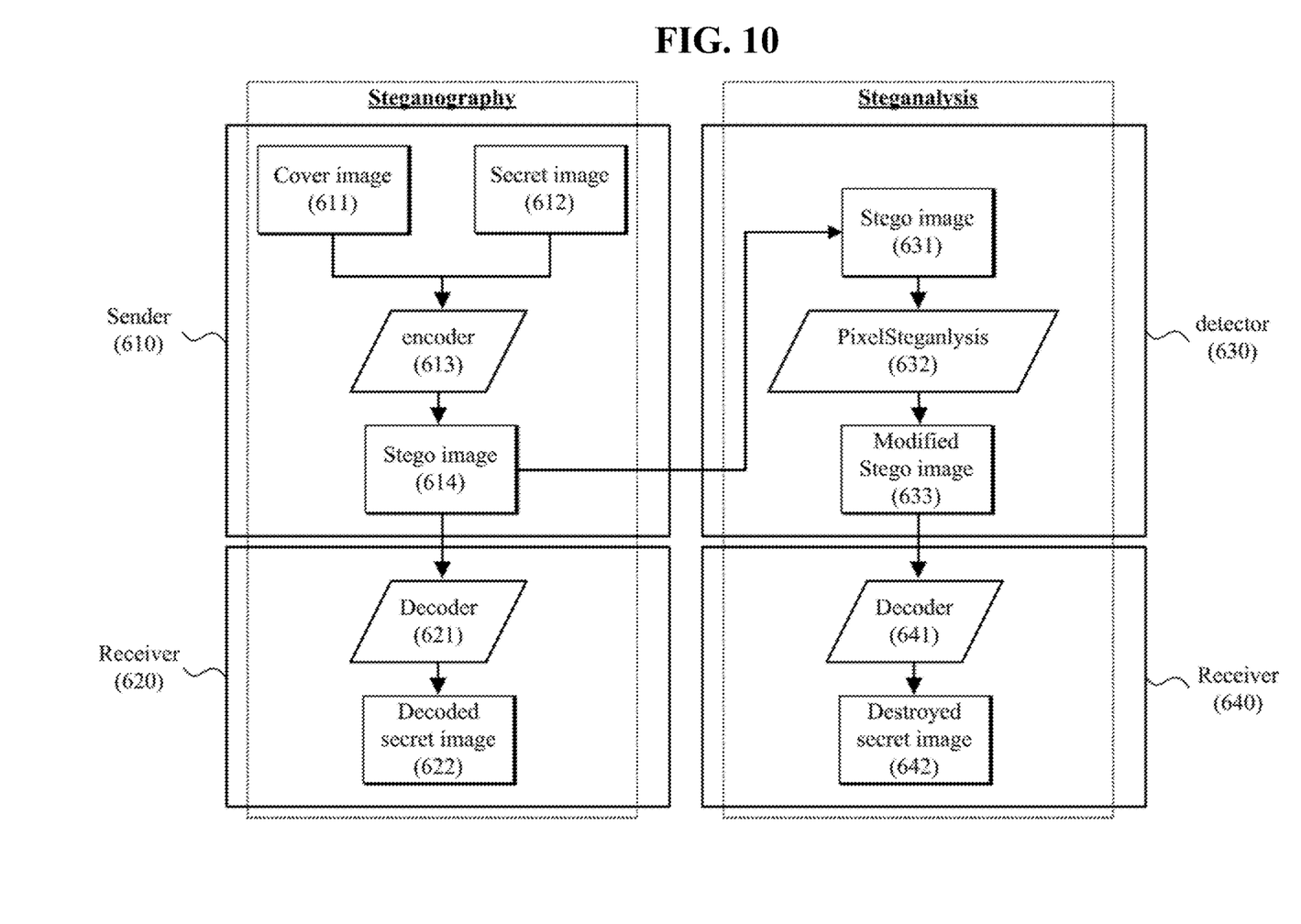
FIG. 10 illustrates an example model of removing hidden data and transmitting or sharing an image.

FIG. 10 illustrates an example model of removing hidden data and transmitting or sharing an image. First, a process (steganography) in which information is leaked will be described to the left of FIG. 10. A sender 610 inserts a secret image 612 into a cover image 611 using steganography. The cover image 611 corresponds to the aforementioned source image X. The sender 610 generates a stego image 614 using an encoder 613 which performs steganography. The stego image 614 refers to the cover image 611 into which the secret image 612 is inserted. A receiver 620 generates a decoded secret image 622 from the stego image 614 using a decoder 621 which performs secret information. Through such a process, the secret image 612, which is the secret information, is leaked.

To the right of FIG. 10, a process of blocking leakage of secret information using an image (the aforementioned hidden data removal process) is shown. The hidden data removal process is performed through image analysis and thus is indicated as steganalysis. The detector 630 receives the stego image 614 generated by the sender 610. The stego image acquired by the detector 630 is indicated by "631." The detector 630 generates a modified stego image 633 using the aforementioned hidden data removal model 632 (indicated as PixelSteganlysis). The modified stego image 633 corresponds to the aforementioned source image X'. Now, it is not possible to acquire secret information from an image despite using a decoder 641 which decodes the secret information. A result of the decoding is a destroyed secret image 642.

Figure 11:
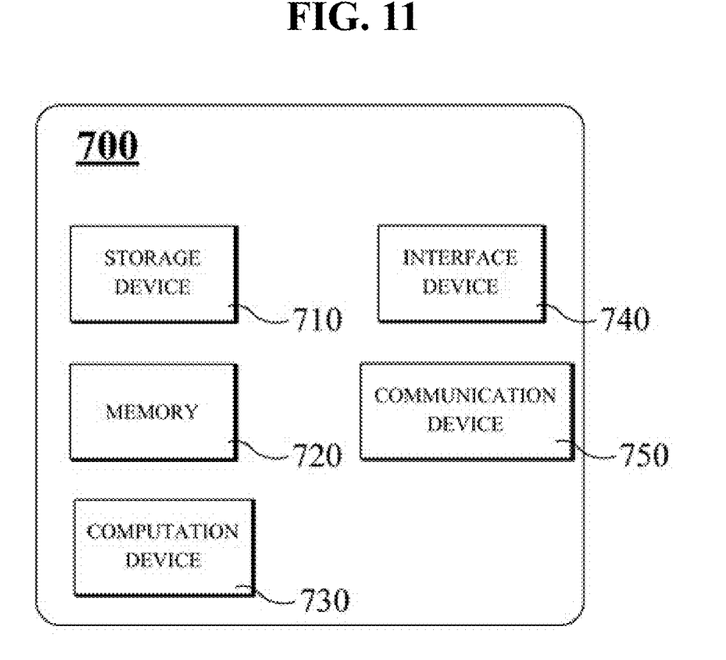
FIG. 11 illustrates an example apparatus for removing hidden data.

FIG. 11 illustrates an example hidden data removal apparatus 700. FIG. 10 corresponds to a configuration of the above-described image processing server 110 or image processing terminal 210. FIG. 10 corresponds to a configuration of the above-described computer device. The hidden data removal apparatus 700 includes a storage device 710, a memory 720, a computation device 730, an interface device 740, and a communication device 750.

The storage device 710 stores a machine learning model for generating or restoring a target pixel of a source image. The storage device 710 may store the aforementioned autoregressive generative model. Furthermore, the storage device 710 may store a program or source code needed for image processing. The storage device 710 may store a program or source code for detecting an edge of an image.

The memory 720 may store a source image received by the hidden data removal apparatus 700, a target pixel identifier, a characteristic map generated during a target pixel generation process, and temporary data such as parameters.

The interface device 740 is a device for receiving a certain command from an external user. The interface device 740 may receive an autoregressive generative model, parameters for a generative model, and a control program from an external storage device of a physically connected input device.

The communication device 750 refers to an element for receiving and transmitting certain information through a wired or wireless network. The communication device 750 receives a source image X from an external object. The communication device 750 transmits a source image X' from which the hidden data has been removed to another user or object.

The communication device 750 or the interface device 740 is a device for receiving certain data or commands from the outside. The communication device 750 or the interface device 740 may be called an input device.

The computation device 730 processes a source image using the autoregressive generative model and program stored in the storage device 710.

The computation device 730 may randomly select a target pixel from the source image. The computation device 730 may detect an edge (an edge region) from the source image using an edge detection program and may select a target pixel from among pixels constituting the edge (the edge region). The computation device 730 may remove the hidden data through reconfiguration of some of the pixels of the source image including the hidden data. The computation device 730 may regenerate the target pixel and change a pixel value of the target pixel. Thus, the computation device 730 may change or remove the hidden data. The detailed hidden data removal process is the same as described above. The computation device 730 may be a device such as a processor for processing data and performing certain computation, an access point (AP), or a chip in which a program is embedded.

Also, the above-described hidden data removal method may be implemented with a program (or an application) including an executable algorithm that may be executed by a computer. The program may be stored and provided in a non-transitory computer-readable medium.

The non-transitory computer-readable medium refers not to a medium that temporarily stores data such as a register, a cache, and a memory but to a medium that semi-permanently stores data and that is readable by a device. Specifically, the above-described various applications or programs may be provided while being stored in a non-transitory computer-readable medium such as a compact disc (CD), a digital versatile disc (DVD), a hard disk, a Blu-ray disc, a Universal Serial Bus (USB), a memory card, a read-only memory (ROM), etc.

According to the following description, it is possible to remove hidden data without damaging the quality of an input image using a neural network model. According to the following description, it is possible to actively remove hidden data in an image release or distribution process without needing to detect the hidden data.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of neutralizing an attack of steganography based on an autoregressive generative model, the method being performed by a computer device, the method comprising:
   receiving a source image including steganography-based hidden data;
   randomly selecting a plurality of target pixels from the source image; and
   correcting the source image by inputting the source image and an identifier of the plurality of target pixels to the autoregressive generative model to damage the hidden data,
   wherein the autoregressive generative model changes a value of a selected pixel on the basis of a pixel value distribution for pixels adjacent to the pixel in an input image,
   wherein the hidden data comprises a series of values from a plurality of pixels in the source image, the plurality of pixels being randomly distributed in the source image, and
   wherein the hidden data comprises of a value of at least one pixel of the plurality of target pixels.

2. The method of claim 1, further comprising detecting an edge of the source image,
   wherein the computer device selects the plurality of target pixels from the edge.

3. The method of claim 1, wherein the autoregressive generative model is PixelCNN or Gated PixelCNN.

4. The method of claim 1, wherein the autoregressive generative model determines a pixel value of the target pixel such that at least one of a peak signal-to-noise ratio (PSNR) and a structure similarity index (SSIM) is maintained at a reference value or greater on the basis of a likelihood of the pixel value distribution.

5. The method of claim 1, wherein an input characteristic map and an output characteristic map have a same size, and the autoregressive generative model performs convolution using only some input characteristics.

6. The method of claim 1, wherein the source image has a standardized format, and the autoregressive generative model is prepared by pre-learning an image distribution of the source image.

7. The method of claim 1, wherein the computer device changes the target pixel on the basis of the adjacent pixels, which are included in a window having a center at which the target pixel is located.

8. An apparatus for neutralizing an attack of steganography based on an autoregressive generative model, the apparatus comprising:
   an input device configured to receive a source image in which steganography-based data is hidden;
   a storage device configured to store an autoregressive generative model for changing a specific pixel on the basis of a pixel value distribution for pixels adjacent to the specific pixel in an image; and
   a computation device configured to select a plurality of target pixels from the source image, correct the source image by inputting the source image and an identifier of the target pixel to the autoregressive generative model to damage the steganography-based data,
   wherein the hidden data comprises a series of values from a plurality of pixels in the source image, the plurality of pixels being randomly distributed in the source image, and
   wherein the steganography-based data comprises of a value of at least one pixel of the plurality of target pixels.

9. The apparatus of claim 8, wherein the autoregressive generative model is PixelCNN or Gated PixelCNN.

10. The apparatus of claim 8, wherein the autoregressive generative model determines a pixel value of the target pixel such that at least one of a peak signal-to-noise ratio (PSNR) and a structure similarity index (SSIM) is maintained at a reference value or greater on the basis of a likelihood of the pixel value distribution.

11. The apparatus of claim 8, wherein an input characteristic map and an output characteristic map have the same size, and the autoregressive generative model performs convolution using only some input characteristics.

12. The apparatus of claim 8, wherein the source image has a standardized format, and the autoregressive generative model is prepared by pre-learning an image distribution of the source image.

13. The apparatus of claim 8, wherein the computation device changes the target pixel on the basis of the adjacent pixels, which are included in a window having a center at which the target pixel is located.

14. The apparatus of claim 8,
wherein the storage device further stores an edge detection program for detecting an edge of an image, and
wherein the computation device detects an edge of the source image using the edge detection program and then selects the target pixel from the edge.

15. A computer-readable recording medium having a computer program recorded thereon to execute the method of claim 1.

\* \* \* \* \*